United States Patent
Kim et al.

(10) Patent No.: US 7,570,717 B2
(45) Date of Patent: Aug. 4, 2009

(54) APPARATUS AND METHOD FOR PILOT-LESS CARRIER ACQUISITION OF VESTIGIAL SIDEBAND (VSB) SIGNAL

(75) Inventors: Min-ho Kim, Suwon-si (KR); Beom-kon Kim, Daegu (KR); Dong-seog Han, Daegu (KR); Hae-sock Oh, Daegu (KR); Junling Zhang, Yongin-si (KR); Ki-dong Kang, Anyang-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 929 days.

(21) Appl. No.: 11/035,744

(22) Filed: Jan. 18, 2005

(65) Prior Publication Data
US 2005/0157821 A1 Jul. 21, 2005

(30) Foreign Application Priority Data
Jan. 19, 2004 (KR) .................. 10-2004-0003803

(51) Int. Cl.
*H04L 27/00* (2006.01)
(52) U.S. Cl. .................................................... 375/326
(58) Field of Classification Search .................. 375/326
See application file for complete search history.

(56) References Cited

U.S. PATENT DOCUMENTS

| | | | | |
|---|---|---|---|---|
| 5,483,292 A * | 1/1996 | Ko | .............. | 348/537 |
| 5,606,579 A * | 2/1997 | Patel et al. | .............. | 375/321 |
| 5,799,047 A | 8/1998 | Dobrica | | |
| 5,877,816 A * | 3/1999 | Kim | .............. | 348/526 |
| 5,886,748 A * | 3/1999 | Lee | .............. | 348/614 |
| 6,188,441 B1 * | 2/2001 | Limberg | .............. | 348/555 |
| 6,426,972 B1 * | 7/2002 | Endres et al. | .............. | 375/229 |
| 6,449,325 B1 * | 9/2002 | Limberg | .............. | 375/364 |
| 6,967,694 B1 * | 11/2005 | Ninomiya et al. | .............. | 348/726 |
| 2001/0033625 A1 * | 10/2001 | Ninomiya et al. | .............. | 375/316 |
| 2004/0201779 A1 * | 10/2004 | Spilker, Jr. | .............. | 348/510 |

FOREIGN PATENT DOCUMENTS

| | | |
|---|---|---|
| JP | 9--64933 A3 | 3/1997 |
| JP | 2001-168932 A | 6/2001 |
| KR | 10-2001-0040073 A | 5/2001 |

OTHER PUBLICATIONS

Kim, "A symbol timing recovery using the segment sync data for the digital HDTV GA VSB system", IEEE Transactions on Consumer Electronics, vol. 42, Issue 3, Aug. 1996 pp. 651-656.*
Ray Andraka, "A Survey of CORDIC algorithms for FPGA based computers", FPGA 98 Monterey CA USA, 1998.

* cited by examiner

*Primary Examiner*—Juan A Torres
(74) *Attorney, Agent, or Firm*—Harness, Dickey & Pierce, P.L.C.

(57) ABSTRACT

A method for demodulating a carrier wave in a channel environment in which a pilot signal may be distorted, in a digital TV receiver, which may receive a vestigial sideband (VSB) modulated and transmitted signal, and a demodulation apparatus therefor are provided. A field synchronization part of a VSB signal, in which a pilot signal may be removed, may be used as a reference signal for synchronization. The frequency offset of a carrier wave may be estimated through self-correlation of a signal, and the phase offset of the carrier wave may be estimated through a pilot-less frequency and phase locked loop (FPLL).

35 Claims, 11 Drawing Sheets

APPARATUS AND METHOD FOR PILOT-LESS CARRIER ACQUISITION OF VESTIGAL SIDEBAND (VSB) SIGNAL

BACKGROUND OF THE INVENTION

This application claims the priority of Korean Patent Application No. 2004-3803, filed on Jan. 19, 2004, in the Korean Intellectual Property Office, the disclosure of which is incorporated herein in its entirety by reference.

1. Field of the Invention

Exemplary embodiments of the present invention relate to digital television (DTV).

2. Description of the Conventional Art

Digital broadcasting may be achieved using, for example, satellites, ground waves, or cables as transmission media. These transmission media have their respective characteristics, and based on these characteristics, different bandwidth and modulation methods may be used.

In ground wave digital broadcasting, the frequency band may be, for example, ultra high frequency/very high frequency (UHF/VHF). In order to maintain compatibility with analog broadcasting, bandwidth may also be the same, or substantially the same, as conventional broadcasting. Transmission formats may use a higher bit transmission rate over a reduced bandwidth through multi-level modulation techniques such as a vestigial sideband (VSB) method.

A digital TV (DTV) signal may be transmitted with a weaker strength compared to the analog TV signal strength. DTV signal standards may include a variety of coding methods and channel equalization methods.

FIG. 1 is an example diagram of a VSB data frame format containing data and a synchronization signal. Referring to FIG. 1, a frame may include two fields, and each field may include 313 data segments. A data segment may be formed of 832 symbols.

The first 4 symbols of a data segment may be a segment synchronization part such as a horizontal synchronization signal, and a first data segment in a field may be a field synchronization part such as a vertical synchronization signal.

FIG. 2 illustrates an example of the composition of the field synchronization part, which may include the segment synchronization part of 4 symbols, pseudorandom number sequences, VSB mode related information of 24 symbols, and 104 symbols, which may not be used. The PN511 sequence may be formed of 511 pseudo-random symbols. The second PN63 sequence of 3 PN63 sequences may be inverted in each successive field. A logic level '1' may transition to logic level '0' and logic level '0' may transition to logic level '1'. Based on the polarity of the second PN63, fields may be divided into even fields and odd fields.

At a broadcasting station, before transmitting a signal, the signal may pass through a mapper, which may change the signal to a desired power level. When broadcasting 8 VSB, an output level of a mapper may be one of 8 level symbol levels (amplitude levels). According to a VSB standard, a horizontal synchronization signal of 4 symbols may be generated and inserted into every 832 symbols. The horizontal synchronization signal (1, 0, 0, 1) may have two levels, and may be repeated (e.g., continuously) in each data segment.

FIG. 3 illustrates an example of the frequency characteristic of a broadcast signal defined in DTV standards. Referring to FIG. 3, fc, the center frequency, may indicate a central frequency in 6 MHz bandwidth of each ground wave channel, and $f_p$, the pilot frequency, may indicate a frequency in which a carrier wave of a transmission signal may exist. In a demodulating receiver, the location of a pilot frequency ($f_p$) may be restored and converted into a baseband signal. A carrier wave may be recovered using a frequency and phase locked loop (FPLL). Carrier wave synchronization may depend on a pilot signal and it also may be more sensitive to the distortion of a pilot signal.

FIGS. 4 and 5 illustrate example estimation curves of frequency and phase offsets, respectively, due to distortion of a pilot signal. Referring to FIG. 4, carrier wave offset tracking performance may be degraded more significantly in a negative frequency range. A negative frequency estimation range, for example, when the size of the pilot signal may be reduced by 50%, may be reduced to within −50 kHz, which may be about 25% of the range when the size of the pilot signal may be 100%.

The example phase offset estimation curve of FIG. 5 illustrates that the size of a pilot signal may be reduced by 50%, and the linear interval may remain the same, or substantially the same, as when the size of the pilot signal may be 100%.

SUMMARY OF THE INVENTION

An exemplary embodiment of the present invention may provide a method of estimating a pilot-less carrier wave frequency offset. The method may include receiving a vestigial sideband (VSB) signal for which a pilot may have been removed, performing self-correlation by correlating neighboring pseudorandom noise 63 (PN63) signals, estimating the frequency offset of the received VSB signal by sampling, delaying, and multiplying the self-correlated PN63 signal, and confirming whether or not the estimated frequency offset value is within a PN63 range.

Another exemplary embodiment of the present invention may provide a frequency tracking locking control unit adapted to compensate a carrier wave frequency of a stored 1 field synchronization signal of a pilot-less VSB signal according to the estimated carrier wave frequency offset, and output a frequency tracking locking signal based on a cross-correlation of the stored 1 field synchronization signal.

Another exemplary embodiment of the present invention may provide a demodulating apparatus adapted to receive a VSB signal, remove the pilot signal from the VSB signal forming a pilot-less VSB signal, and estimate a frequency offset and a phase error based on the pilot-less VSB signal.

Another exemplary embodiment of the present invention may provide a controller adapted to receive an amplitude and a first phase signal of pilot-less VSB signal and output a mean value of a second phase signal determined based on an interval of a noise signal.

Another exemplary embodiment of the present invention may provide an apparatus for demodulating a carrier wave. The apparatus may comprise an analog-to-digital conversion unit, a baseband demodulation unit, a direct current (DC) remover, an automatic frequency controller (AFC), a frequency and phase locked loop (FPLL), a multi-loop filter, and a numerically controlled oscillator (NCO).

Another exemplary embodiment of the present invention may provide a method for demodulating a carrier wave. The method may comprise removing a pilot component from a received VSB signal, estimating a frequency offset from the pilot-less VSB signal by using a PN63 signal, estimating a phase offset from the pilot-less VSB signal, and compensating for the phase offset of the received VSB signal based on the estimated frequency and phase offsets.

Another exemplary embodiment of the present invention may provide a pilot-less automatic frequency controller for estimating the frequency offset of a carrier wave. The automatic frequency controller may comprise a self-correlator, an operation unit, a control unit, and a calculation unit.

Another exemplary embodiment of the present invention may provide a control unit adapted to receive a phase signal obtained from a pilot-less VSB signal and output a signal indicating an interval of a noise signal based on a comparison of a reference signal and a mean value determined based on an absolute value of the phase signal.

In exemplary embodiments of the present invention, the frequency offset may be estimated based on the number of samples taken when sampling the PN63 self-correlated signal, the time interval of a signal a number of samples used to integrate a plurality of estimates of the frequency offsets.

In exemplary embodiments of the present invention, the self-correlated PN63 signal may be sampled twice, a number of samples may be 126 and the sampling time may correspond to 21.52 MHz.

In exemplary embodiments of the present invention, a number of samples may be variably determined within a number of double oversampled samples of two of the PN63 self-correlated signal intervals.

In exemplary embodiments of the present invention, confirming whether or not the estimated frequency offset value may be within the range may be based on a number of samples of the self-correlated signal, and a time interval of a signal with a sample rate corresponding to the number of samples.

In exemplary embodiments of the present invention, confirming whether or not the estimated frequency offset value may be within the PN63 range may be based on a number of samples of the PN63 self-correlated signal, and a time interval of a signal with a sample rate corresponding to the number of samples.

In exemplary embodiments of the present invention, if the self-correlated PN63 signal is sampled twice, the number of samples may be 126, the time interval may correspond to 21.52 MHz, and the PN63 range may be ±85 kHz.

In exemplary embodiments of the present invention, the self-correlator may be a PN63 self-correlator.

In exemplary embodiments of the present invention, the operation unit may be a coordinate rotation digital computer (CORDIC) operation unit.

In exemplary embodiments of the present invention, the self-correlator may have an input of the received pilot-less VSB signal with a symbol rate of an integer number of times.

In exemplary embodiments of the present invention, the control unit may include a first calculation unit, a delay unit, an adder, a second calculation unit, a third calculation unit, and a comparator.

In exemplary embodiments of the present invention, the method for demodulating a carrier wave may further include locking the estimated carrier wave frequency offset.

In exemplary embodiments of the present invention, estimating the phase offset may further include multiplying an I signal and a Q signal of the received pilot-less VSB signal, and estimating the phase offset by low-pass filtering the multiplication result.

In exemplary embodiments of the present invention, when compensating for the frequency and phase offsets of the received VSB signal, the output of a numerically controlled oscillator (NCO) may be multiplied by the received VSB signal to compensate for the frequency and phase offsets of the VSB signal.

In exemplary embodiments of the present invention, the frequency tracking locking control unit may include a field buffer unit, a carrier wave frequency compensation unit, and a PN511 detection unit.

In exemplary embodiments of the present invention, the apparatus for demodulating a carrier wave may further include a mode selection unit.

In exemplary embodiments of the present invention, the baseband demodulation unit may include a poly-phase filter, a down-conversion unit, matching filters, and an up-conversion unit.

In exemplary embodiments of the present invention, the controller may include a self-correlator, an operation unit, a control unit, and a calculation unit.

In exemplary embodiments of the present invention, the control unit may include a first absolute value calculation unit, a delay unit, an adder, a second absolute value calculation unit, a mean value calculation unit, and a comparator.

In exemplary embodiments of the present invention, the demodulating apparatus may be adapted to generate a complex carrier wave signal based on the frequency offset and phase error and compensates for a carrier wave frequency offset based on the estimated frequency offset.

In exemplary embodiments of the present invention, the demodulating apparatus may further include an analog-to-digital conversion unit, a baseband demodulation unit, a direct current (DC) remover, an automatic frequency controller (AFC), a frequency and phase locked loop (FPLL), a multi-loop filter, and a numerically controlled oscillator (NCO).

BRIEF DESCRIPTION OF THE DRAWINGS

Exemplary embodiments of the present invention will become more apparent by describing in detail exemplary embodiments thereof with reference to the attached drawings in which.

DETAILED DESCRIPTION OF THE EXEMPLARY EMBODIMENTS OF THE PRESENT INVENTION

Figure 1:
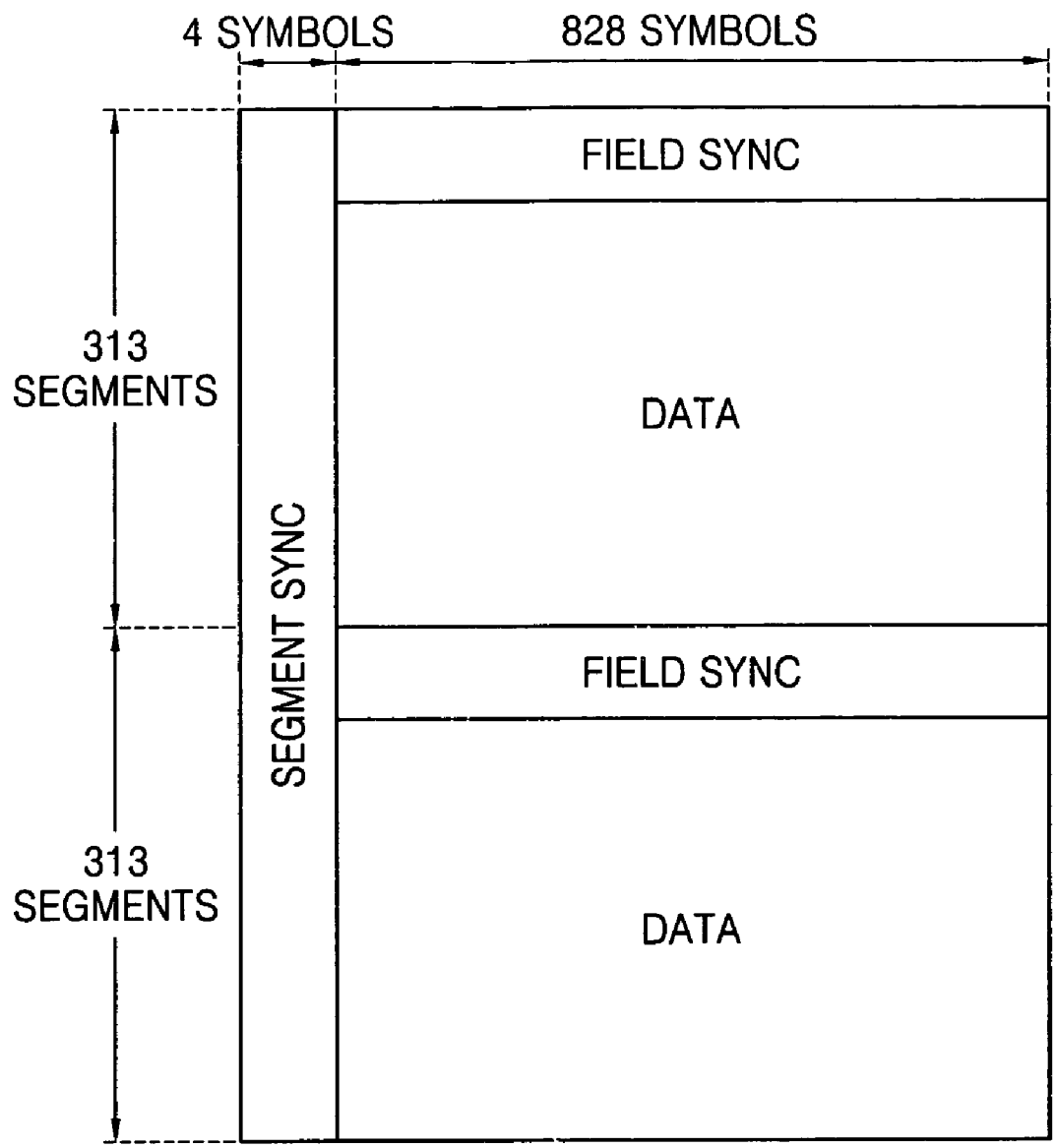
FIG. 1 is an example diagram of a vestigial sideband (VSB) data frame format containing data and a synchronization signal.
Figure 2:
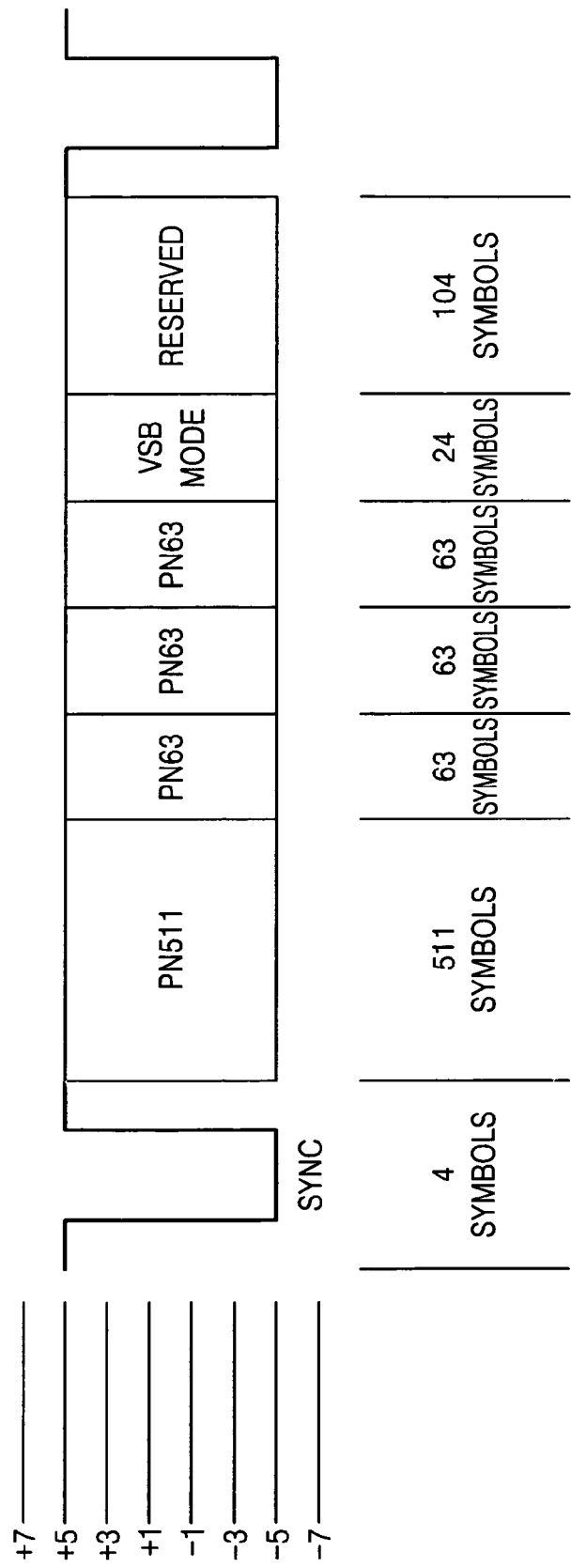
FIG. 2 is an example diagram of the composition of a field synchronization part of FIG. 1.
Figure 3:
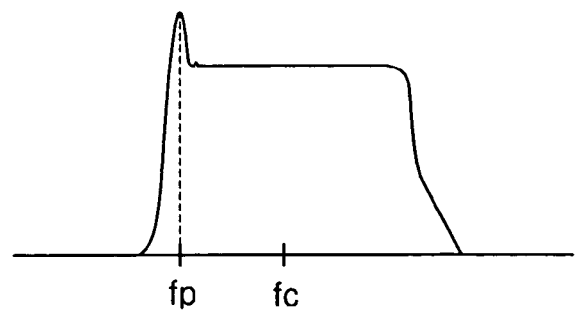
FIG. 3 is an example diagram showing the frequency characteristic of a broadcast signal defined in DTV standards.
Figure 4:
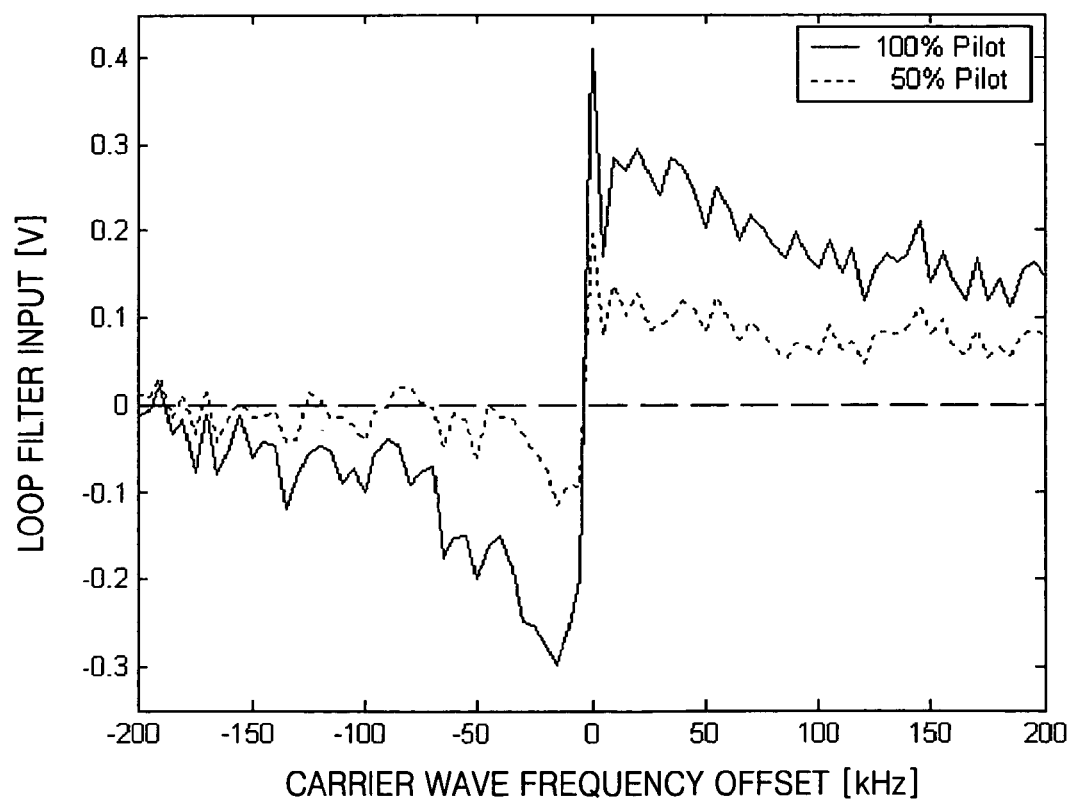
FIGS. 4 and 5 are example graphs showing estimation curves of frequency and phase offsets, respectively.
Figure 5:
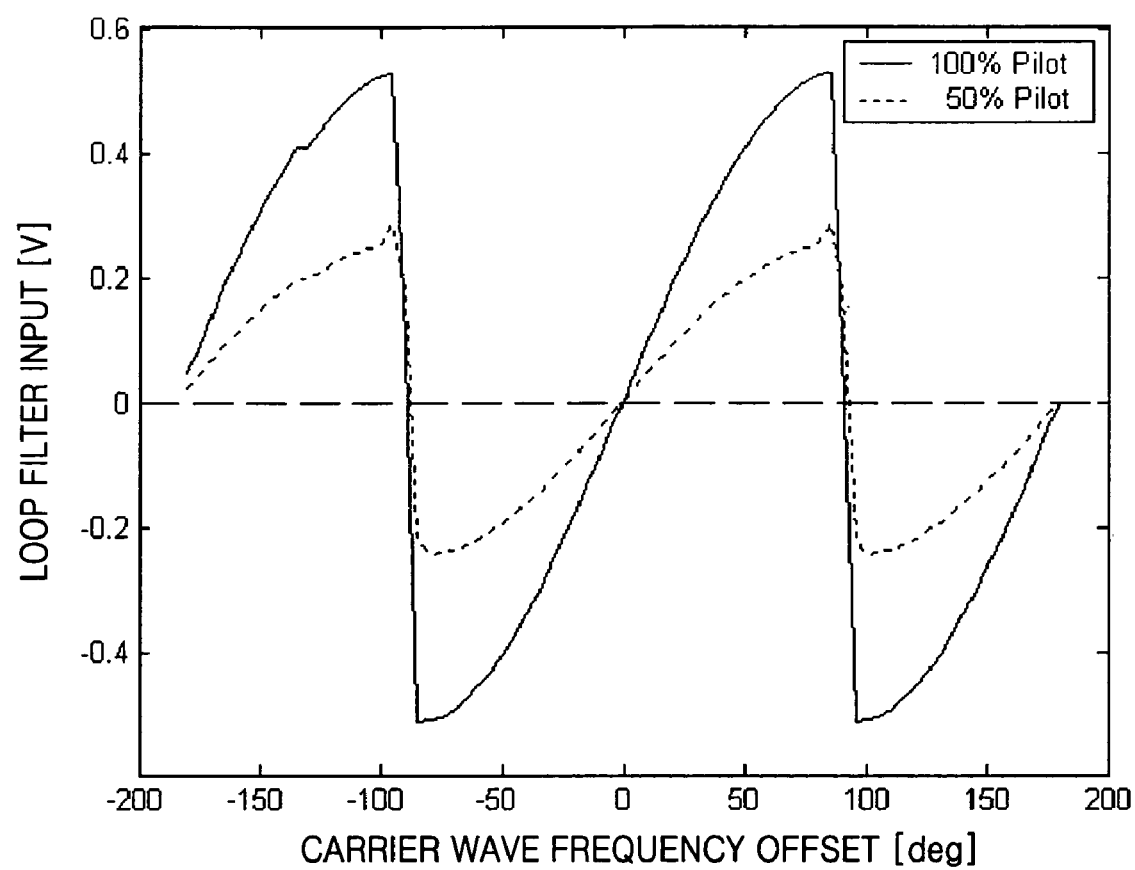

Exemplary embodiments of the present invention will be described in detail by explaining exemplary embodiments of the invention with reference to the attached drawings. In the drawings, whenever the same element reappears in subsequent drawings, it is denoted by the same reference numeral.

Exemplary embodiments of the present invention may provide a carrier wave demodulation apparatus, an automatic frequency controller (AFC), a pilot-less frequency and phase locked loop (FPLL), and carrier wave frequency offset estimating apparatus, which may estimate a carrier wave frequency offset.

Figure 6:
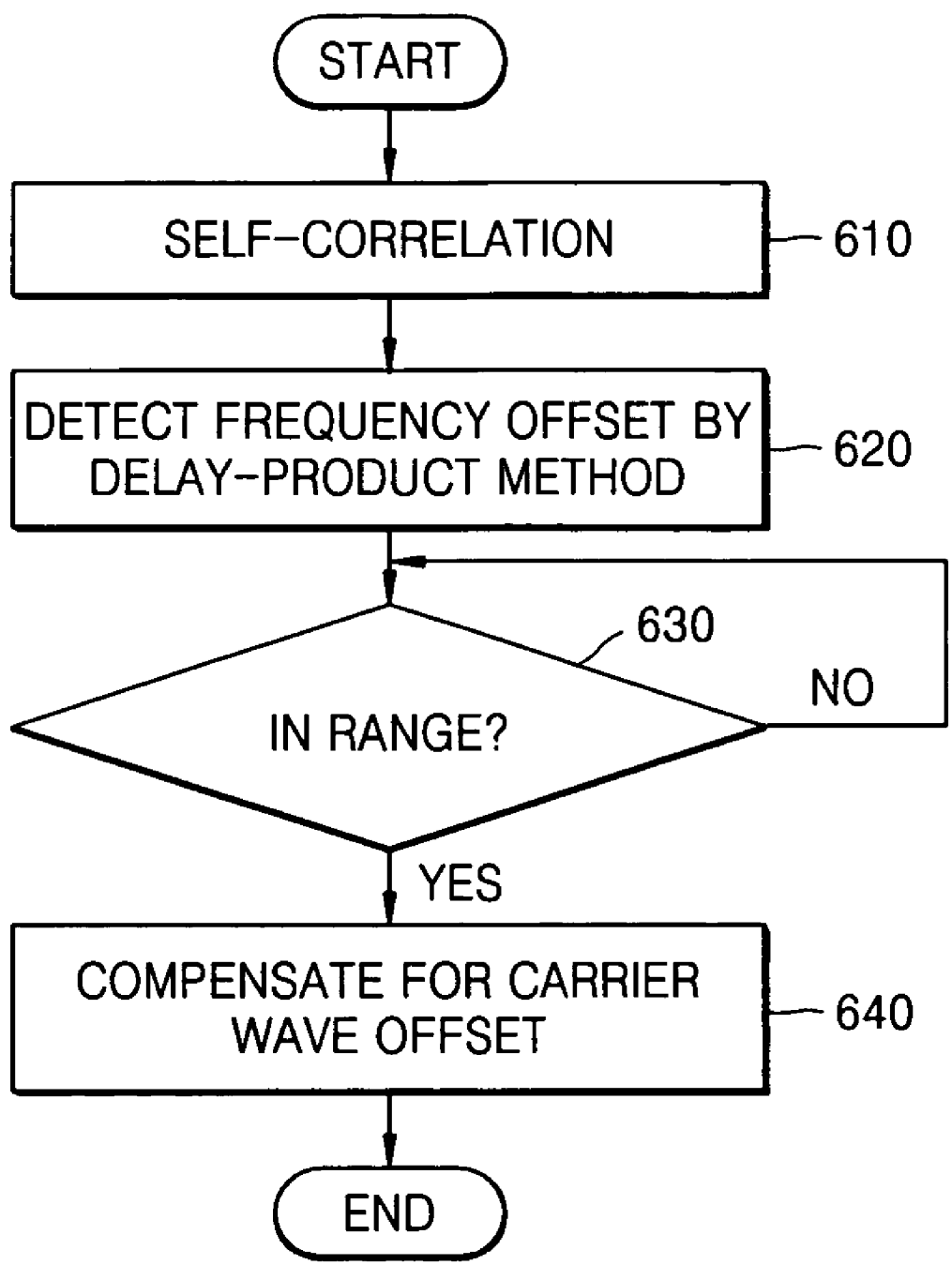
FIG. 6 is a flowchart illustrating an exemplary embodiment of a method of estimating a carrier wave frequency offset according the present invention.

FIG. 6 is a flowchart illustrating a method for estimating a pilot-less carrier wave frequency offset, according to an exemplary embodiment of the present invention. Referring to FIG. 6, an exemplary embodiment of the method for estimating a pilot-less carrier wave frequency offset may include self-correlation 610, estimating a frequency offset, using a delay-multiply method 620, confirming PN63 range 630, and compensating for a carrier wave offset.

Self-correlation (e.g., PN63 self-correlation) 610 may use three PN63 signals, which may be training symbols included in a field synchronization signal. I (in-phase) and Q (quadrature phase) signals, may be received and the received I and Q signals may be complex signals obtained by delaying the received I and Q signals. An introduced DC component may be removed.

A frequency offset may be estimated at 620 using, for example, a delay-multiply method, which may detect an offset estimation error. The offset estimation error may be a result of effects of multi-path signals and/or noise. The number of symbols may reduce the effects of the offset estimation error. At 620, a frequency offset may be estimated using equation 1:

$$\hat{f} = \frac{1}{2\pi DT_s} \sum_{k=1}^{M} \arg\left[\frac{\text{Im}[S_{PN63}(k)S^*_{PN63}(k-D)]}{\text{Re}[S_{PN63}(k)S^*_{PN63}(k-D)]}\right] \quad (1)$$

D, which may be 126, may denote the number of PN63 signal samples, which may be double oversampled, and TS may denote a time interval of a signal with double the sample rate, for example, 21.52 MHz. M, which may be the number of samples used to integrate a frequency offset estimate, may be determined (e.g., variably determined) within the number of double oversampled samples during two of PN63 signal intervals, by a controller. Correlative interference, which may be caused by random normal data components and/or PN511 signals may be removed.

The PN63 range may be confirmed at 630, that is, whether or not the result of estimating a frequency offset may be within a estimated range, by the following expression 2:

$$|\hat{f}| < \frac{1}{2Dt_s} \quad (2)$$

A carrier wave offset may be compensated at 640. The mean value of phase information during M sample intervals may be obtained, and the output may be estimated as a frequency offset.

This estimated frequency offset may be compensated for by a numerically controlled oscillator (NCO).

Figure 7:
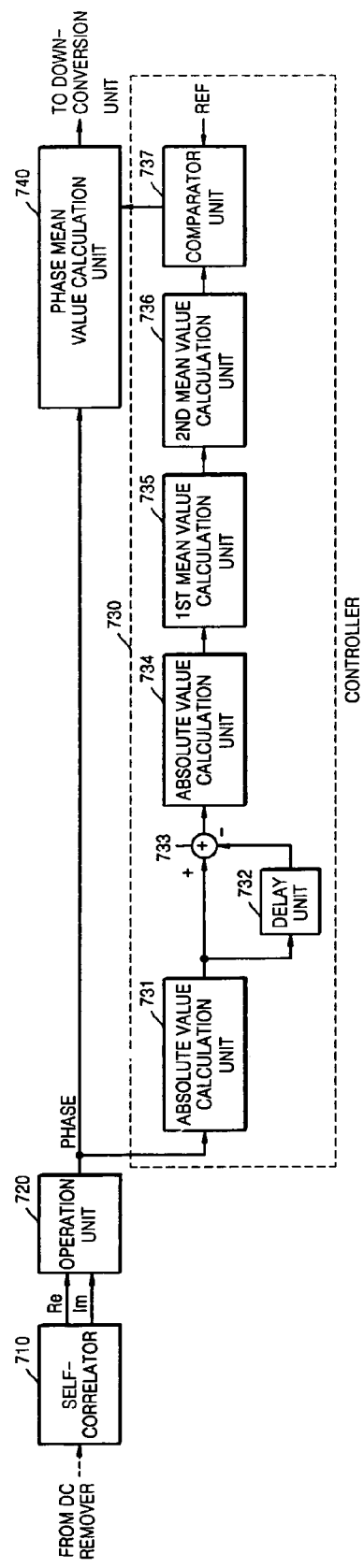
FIG. 7 is a diagram illustrating an exemplary embodiment of a controller, according to the present invention.

FIG. 7 is a diagram illustrating an exemplary embodiment of the automatic frequency controller (AFC), according to the present invention. The AFC of FIG. 7 may implement the method for estimating a carrier wave frequency offset as illustrated in FIG. 6. Referring to FIG. 7, the AFC may include a self-correlator (e.g., a PN63 self-correlator) 710, a coordinate rotation digital computer (CORDIC) operation unit 720, a control unit 730, and a phase mean value calculation unit 740.

The self-correlator 710 may receive I and Q signals of PN63 signal with a two-fold symbol rate from the DC remover, and may perform complex-multiplication of neighboring PN63 signals, for example, the first and second, or second and third PN63 signals.

The CORDIC operation unit 720 may receive the complex signal from the self-correlator 710, and may output the complex signal as a phase signal and an amplitude signal, which may have a real number component, by using a CORDIC algorithm.

The control unit 730, may receive from the CORDIC operation unit 720 a phase signal (PHASE), may obtain the mean value of the phase signal, and may transmit the value to the mean value calculation unit 740. The control unit 730 may include an absolute value calculation unit 731, which may obtain an absolute value of the phase signal provided from the CORDIC operation unit 720, a delay unit 732, which may delay the output of the absolute value calculation unit 731 for example, 16 symbols, an adder 733, which may receive the output from the absolute value calculation unit 731 and the output of the delay unit 732, and may generate a signal corresponding to the difference between the output, an absolute value calculation unit 734, which may obtain the absolute value of the output of the adder 733, mean value calculation units 735 and 736, which may receive the output of the absolute value calculation unit 734, and may obtain the mean value of the phase signal (PHASE), and a comparator 737, which may compare a reference signal (REF) with the mean value of the phase signal (PHASE).

Figure 8:
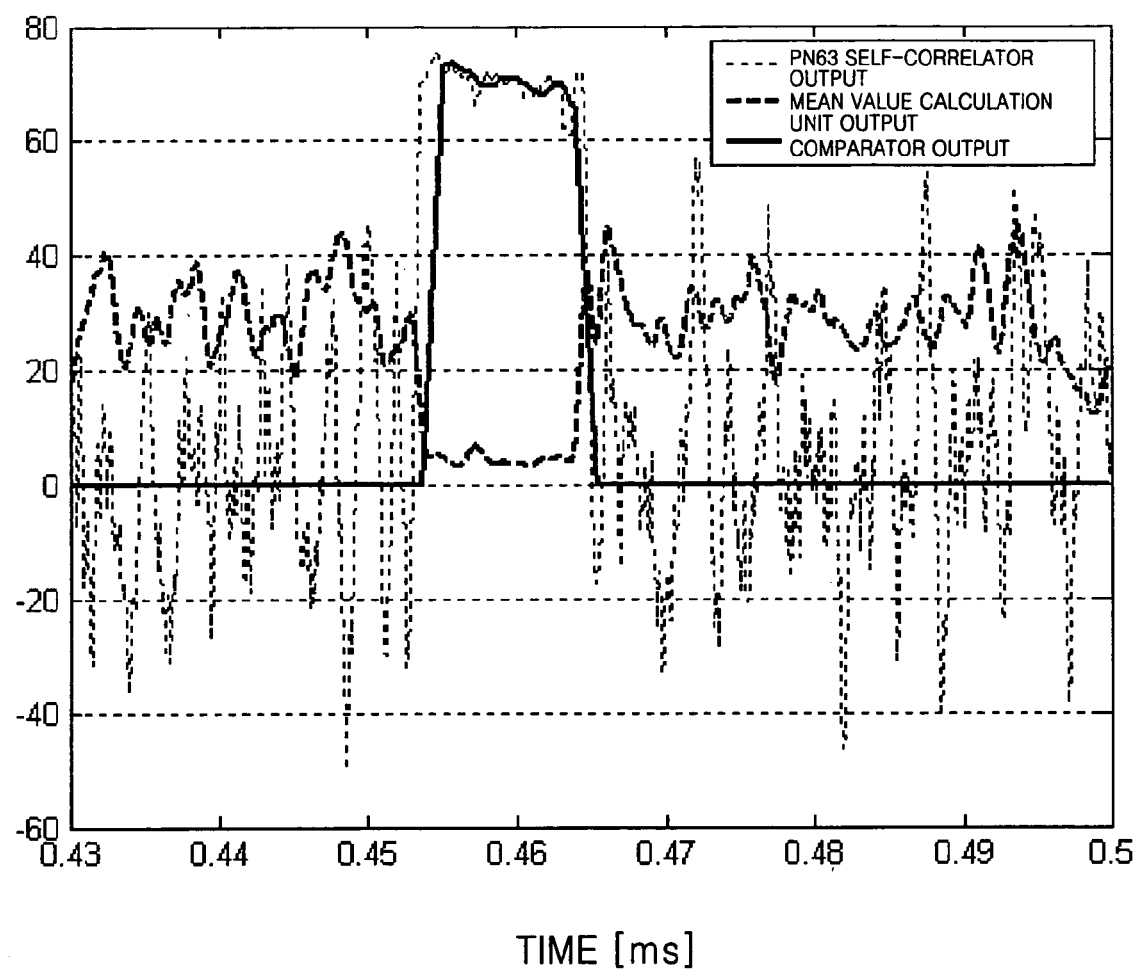
FIG. 8 is a diagram illustrating an example the result of operation of the controller of FIG. 7.

An example result of the control unit 730 is shown as FIG. 8. The signal (marked with a dotted line) passing through the self-correlator 710 may illustrate a random signal output, for example, in non-PN63 signal intervals, and illustrates a constant, or substantial constant, signal output in, for example, the PN63 signal interval, that is, for example, the interval from 0.455 ms through to 0.465 ms.

The signal, which may pass twice through the mean value calculation units 735 and 736 may compared with a reference signal (REF) of the comparator 737, and the output signal (marked by solid lines) of the comparator 737 may illustrate a pulse signal at a logic '1' level. The pulse signal at logic '1' level of the output signal of the comparator 737 may be a PN63 signal interval and may have information on a carrier wave frequency offset.

The output of the comparator 737 may be provided to the phase mean value calculation unit 740, and in response to the logic '1' level of the output of the comparator 737, the phase mean value calculation unit 740 obtain may the mean value of the phase signal PHASE provided by the CORDIC operation unit 720.

Figure 9:
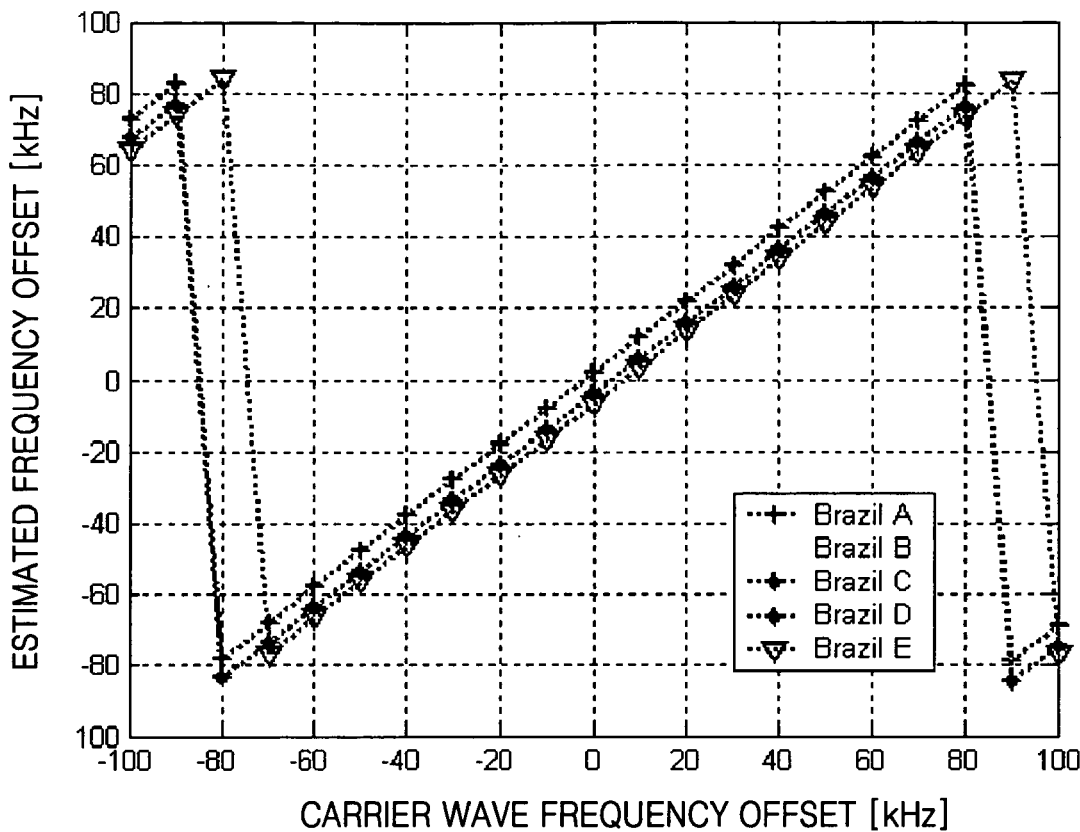
FIG. 9 is a graph illustrating an example result of frequency estimation by an exemplary embodiment of the controller according to the present invention.

FIG. 9 is an example S-curve graph illustrating the result of frequency estimation by an exemplary example of the AFC, according to the present invention. Referring to FIG. 9, the carrier wave frequency offset may be 80 kHz in, for example, all, or substantially all, Brazil channel environments, and the estimated frequency offsets appearing along the Y-axis may be the same, or substantially the same, as the carrier wave frequency offsets set along the X-axis, for example, arbitrarily.

In an exemplary embodiment of a frequency estimation method used by an exemplary embodiment of the AFC, according to the present invention may estimate the frequency offset of a carrier wave due to multipath signals and/or noise, and may use an additional carrier wave synchronization algorithm to compensate for remaining frequency offset and/or phase offset.

Figure 10:
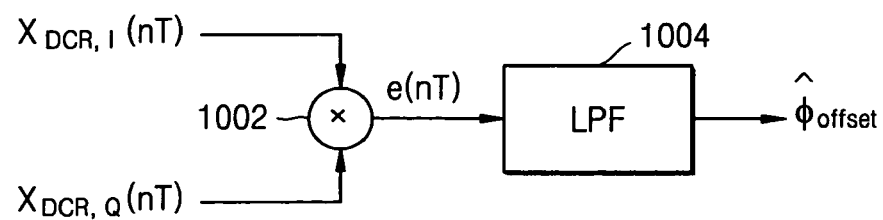
FIG. 10 is a block diagram illustrating an example operation of a frequency and phase locked loop (FPLL), which may be mathematically modeled.

FIG. 10 is a block diagram illustrating an exemplary embodiment of a pilot-less FPLL, according to the present invention. A VSB signal of a baseband, including, for example, a two-fold symbol rate output from a pilot remover, may be modeled (e.g., mathematically), and may be expressed by I data and Q data. I data may be expressed as equation 3 below:

$$x_{DCR,I}(nT) = \sum_{k=0}^{\infty} d_k \cdot \delta(nT - kT)\cos[\Delta\omega(n - \varepsilon n - \gamma)T + \Phi] - \quad (3)$$

$$H\left[\sum_{k=0}^{\infty} d_k \cdot \delta(nT - kT)\right]\sin[\Delta\omega(n - \varepsilon n - \gamma)T + \Phi] +$$

$$A_P \cos[\Delta\omega(n - \varepsilon n - \gamma)T + \Phi] +$$

$$\omega(nT)\cos[\Delta\omega(n - \varepsilon n - \gamma)T + (\omega_1 - \omega_2)nT + \Phi]$$

Q data may be expressed as equation 4 below:

$$x_{DCR,Q}(nT) = \sum_{k=0}^{\infty} d_k \cdot \delta(nT - kT)\sin[\Delta\omega(n - \varepsilon n - \gamma)T + \Phi] - \quad (4)$$

$$H\left[\sum_{k=0}^{\infty} d_k \cdot \delta(nT - kT)\right]\cos[\Delta\omega(n - \varepsilon n - \gamma)T + \Phi] +$$

$$A_P \sin[\Delta\omega(n - \varepsilon n - \gamma)T + \Phi] +$$

$$\omega(nT)\sin[\Delta\omega(n - \varepsilon n - \gamma)T + (\omega_1 - \omega_2)nT + \Phi]$$

For example, H[ ] denotes a Hilbert transform, and $\Delta\omega$ and $\phi$ denote a carrier wave frequency offset and a carrier wave phase offset, respectively. $\varepsilon$ and $\gamma$ denote a symbol timing clock frequency offset and a symbol timing clock phase offset, respectively. $S_n$ and $\hat{S}_n$ may be defined as equations 5 and 6 below:

$$S_n = \sum_{k=0}^{\infty} d_k \cdot \delta(nT - kT) \quad (5)$$

$$\hat{S}_n = H\left[\sum_{k=0}^{\infty} d_k \cdot \delta(nT - kT)\right] \quad (6)$$

I data of equation 3 and Q data of equation 4 may be multiplied by a multiplier 1002, and a carrier wave offset e(nT) may be expressed as equation 7 below:

$$e(nT) = S_n\hat{S}_n\cos[2\Delta\omega(n - \varepsilon n - \gamma)T + 2\Phi] + \quad (7)$$

$$\frac{S_n^2 - \hat{S}_n^2}{2}\sin[2\Delta\omega(n - \varepsilon n - \gamma)T + 2\Phi] +$$

$$A_P S_n \sin[4\Delta\omega(n - \varepsilon n - \gamma)T + 4\Phi] +$$

$$A_P \hat{S}_n \cos[4\Delta\omega(n - \varepsilon n - \gamma)T + 4\Phi] +$$

$$\frac{A_P^2}{2}\sin[4\Delta\omega(n - \varepsilon n - \gamma)T + 4\Phi] + \omega'(nT)$$

$$= C\cos[2\Delta\omega(n - \varepsilon n - \gamma)T + 2\Phi + \theta] +$$

$$A_P S_n \sin[4\Delta\omega(n - \varepsilon n - \gamma)T + 4\Phi] +$$

$$A_P \hat{S}_n \cos[4\Delta\omega(n - \varepsilon n - \gamma)T + 4\Phi] +$$

$$\frac{A_P^2}{2}\sin[4\Delta\omega(n - \varepsilon n - \gamma)T + 4\Phi] + \omega'(nT)$$

Here, $$C = \frac{S_n^2 + \hat{S}_n^2}{2},$$

$$\theta = \tan^{-1}\left(\frac{S_n^2 - \hat{S}_n^2}{2S_n\hat{S}_n}\right)$$

For example, by applying $E[S_n^2] \approx E[\hat{S}_n^2]$, equation 7 maybe expressed as equation 8 below:

$$e(nT) = \frac{C}{E[S_n^2]}\cos[2\Delta\omega(n - \varepsilon n - \gamma)T + 2\Phi + \theta] + \quad (8)$$

$$\frac{A_P S_n}{E[S_n^2]}\sin[4\Delta\omega(n - \varepsilon n - \gamma)T + 4\Phi] +$$

$$\frac{A_P \hat{S}_n}{E[S_n^2]}\cos[4\Delta\omega(n - \varepsilon n - \gamma)T + 4\Phi] +$$

$$\frac{A_P^2}{2E[S_n^2]}\sin[4\Delta\omega(n - \varepsilon n - \gamma)T + 4\Phi] + \omega''(nT)$$

For example, in an expression including a pilot signal, when $\Delta\omega \approx 0$ and $\Phi \approx 0$, the remaining signals may be zero, or substantially zero, and a relational expression, which may have a cosine signal may not be zero. The relational expression, which may have a cosine signal, may have a constant value. There may be no carrier wave frequency offset, signal information, for example, after removing a pilot signal, may be held, and the expression related to final synchronization may be given by equation 9 below:

$$e(nT) = \frac{C}{E[S_n^2]}\cos[2\Delta\omega(n - \varepsilon n - \gamma)T + 2\Phi + \theta] + \omega''(nT) \quad (9)$$

The carrier wave offset e(nT) may be compensated by a numerically controlled oscillator (NCO), and the output ê(nT) of the NCO may be given by equation 10 below:

$$\hat{e}(nT) = \sin[2\Delta\hat{\omega}(n - \varepsilon n - \gamma)T + 2\hat{\Phi}] \quad (10)$$

The signal after compensating for a carrier wave offset in the NCO may be obtained by multiplying e(nT) of equation 9 and ê(nT) of equation 10 and may be expressed as equation 11 below:

$$x_{CR}(nT) = \frac{1}{2}\sin[2(\Delta\hat{\omega} - \Delta\omega)(n - \varepsilon n - \gamma)T + 2(\hat{\Phi} - \Phi)] + \quad (11)$$
$$\frac{1}{2}\sin[2(\Delta\hat{\omega} + \Delta\omega)(n - \varepsilon n - \gamma)T + 2(\hat{\Phi} - \Phi)]$$

The second sine wave signal of equation 11 may be removed by a low pass filter (LPF) 1004. The final offset estimation result $\hat{\phi}_{offset}$ may be obtained by equation 12 below:

$$\hat{\phi}_{offset} = \frac{1}{2}\sin[2(\Delta\hat{\omega} - \Delta\omega)(n - \varepsilon n - \gamma)T + 2(\hat{\Phi} - \Phi)] \approx \quad (12)$$
$$(\Delta\hat{\omega} - \Delta\omega)(1 - \varepsilon) + (\hat{\Phi} - \Phi)$$

As illustrated in equation 12, the carrier wave frequency offset and/or phase offset may be compensated for.

Figure 11:
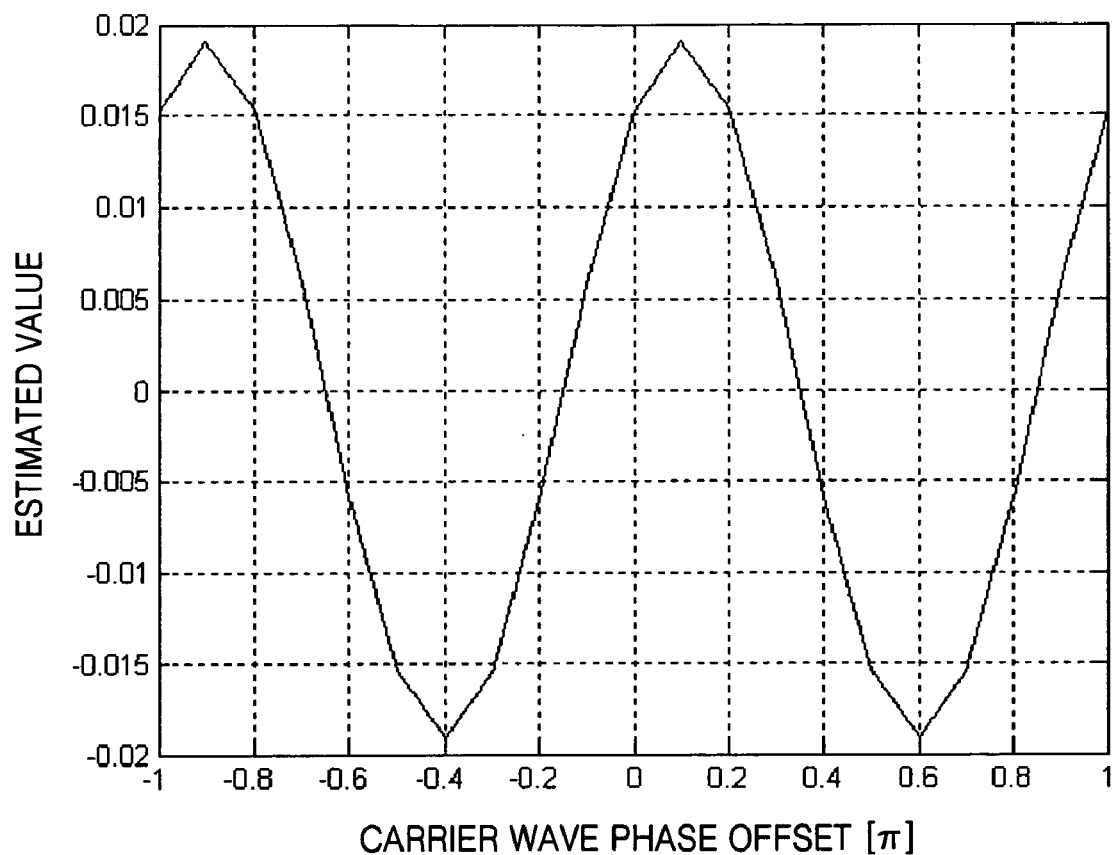
FIG. 11 is a diagram illustrating an estimation curve of a phase offset according to an exemplary embodiment of the FPLL algorithm according to the present invention.

FIG. 11 is a diagram illustrating an example of an estimation curve of a phase offset according to an exemplary embodiment of an algorithm according to the present invention, and the curve may be a cosine curve.

Figure 12:
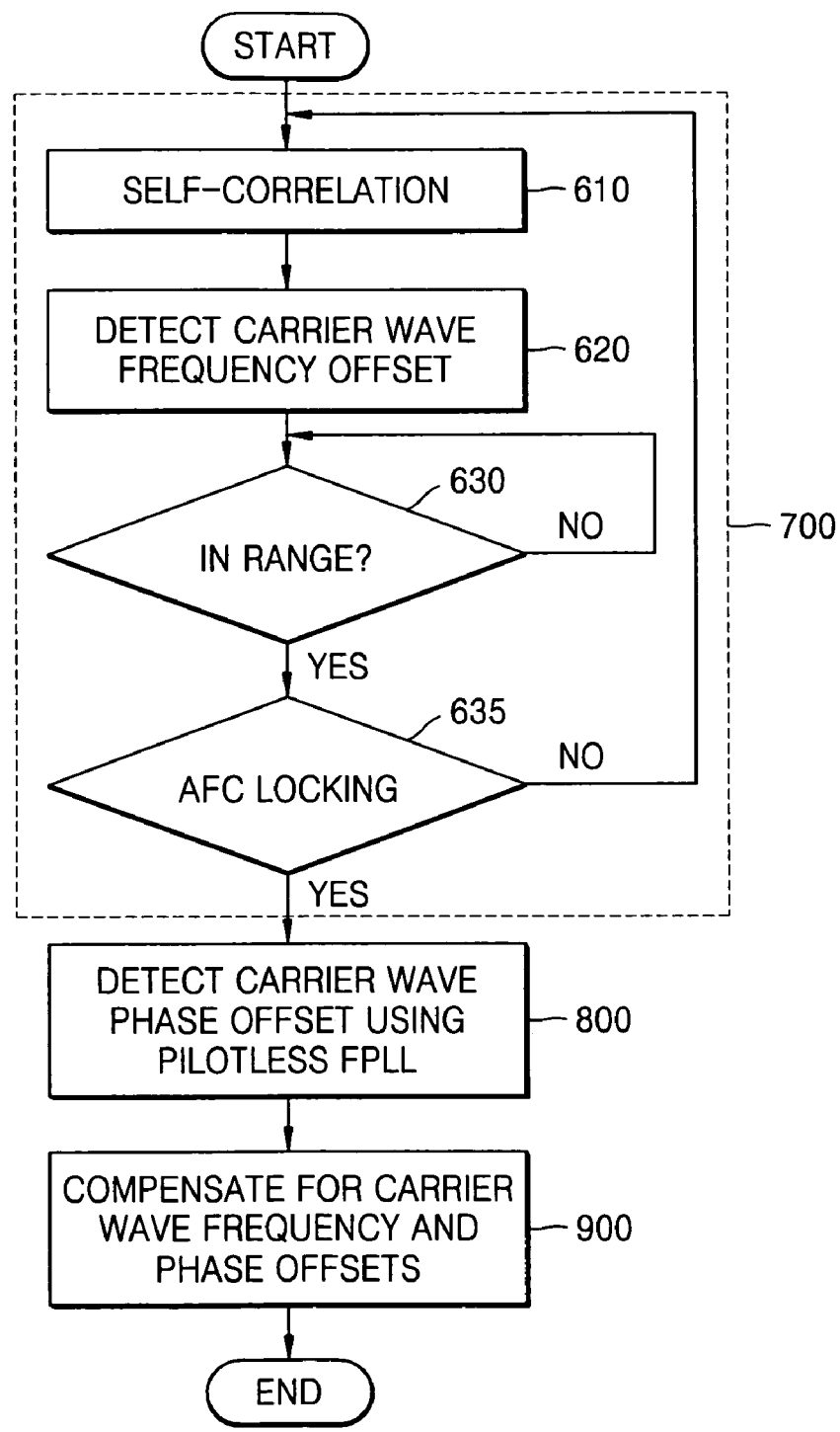
FIG. 12 is a flowchart illustrating an exemplary embodiment of an algorithm, according to the present invention.

FIG. 12 is a flowchart illustrating algorithm according to the present invention. Referring to FIG. 12, as illustrating above with reference to FIG. 6, the carrier wave frequency offset may be estimated in step 700, the carrier wave phase offset may be estimated through a pilot-less FPLL in step 800, and the estimated carrier wave frequency offset and/or phase offset may be compensated for in 900.

In A larger carrier wave frequency offset may be estimated in the field synchronization signal interval. The mode of PN63 signal may be '+−+', or a carrier wave frequency offset beyond an offset estimation range, for example, equal to or greater than 85 kHz, may occur, and an error may occur in estimating the carrier wave frequency offset.

In order to reduce (e.g., prevent) the occurrence of this error, the estimating the carrier wave frequency offset may include self-correlation 610, carrier wave frequency offset detection 620, confirming whether or not the detected carrier wave frequency offset may be within PN63 range 630, and for locking the estimated carrier wave frequency offset 635.

In estimating a carrier wave phase offset through the pilot-less FPLL 800, I and Q signals of the received pilot-less VSB signal may be multiplied, and the multiplication result may be filtered (e.g., low pass filtered) such that the carrier wave phase offset may be estimated.

In compensating for carrier wave frequency and phase offsets 900, the estimated results may be provided to the NCO which, may generate a complex carrier wave (e.g., cosine or sine) corresponding to the estimated carrier wave frequency offset and phase offset, and the frequency of the complex carrier wave (e.g., cosine or sine) may be changed to generate a complex carrier signal close to the carrier wave frequency component of the input signal such that the carrier wave frequency offset and phase offset may be compensated for.

Figure 13:
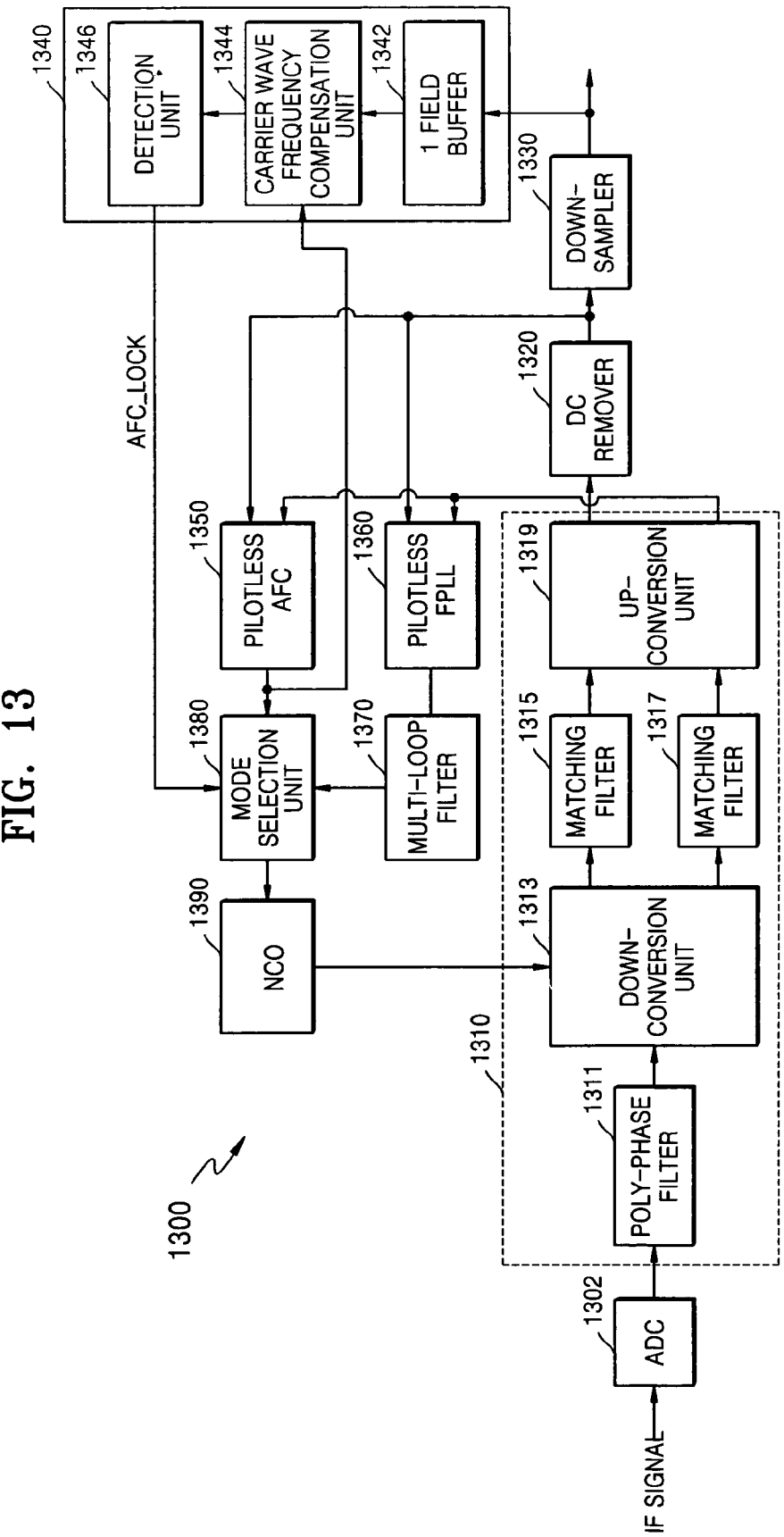
FIG. 13 is a diagram illustrating an exemplary embodiment of a receiver.

FIG. 13 is a diagram illustrating the composition of a DTV receiver (e.g., an Advanced Television Systems Committee (ATSC) DTV receiver), which may implement an exemplary embodiment of the synchronization algorithm of FIG. 12. Referring to FIG. 13, the receiver 1300 may include an analog digital converter (ADC) 1302, a poly-phase filter 1311, a down-conversion unit 1313, filter (e.g., matching filters) 1315 and 1317, an up-conversion unit 1319, a DC remover (or pilot remover) 1320, a down-sampler 1330, a frequency (e.g., a frequency tracking locking control unit) 1340, an AFC unit 1350, a pilot-less FPLL 1360, a multi-loop filter 1370, a mode selection unit 1380, and an NCO 1390.

The ADC 1302 may convert a received VSB signal (e.g., a VSB Intermediate Frequency (IF) signal) into a digital signal. The received VSB signal may be a signal in which, for example, a 6 MHz band from a center frequency of 44 MHz may remain.

The poly-phase filter 1311 may compensate for a sampling timing offset of the VSB signal generated, for example, when the VSB signal may be converted into the digital signal in the ADC 1302. The poly-phase filter 1311 may convert the VSB signal of 24.69 MHz, which may be sampled directly, or indirectly, by the ADC 1302, into a signal with a symbol rate of 21.52 MHz, and may compensate an accurate sampling location, for example, by a symbol timing synchronization loop.

The down-conversion unit convert the 5.38 MHz signal of the received VSB signal into a baseband. The VSB signal may be converted into the baseband signal, and may be provided to the up-conversion unit 1319 through the matching filters 1315 and 1317, and, a real number signal of the IF signal may be extracted and restored to the original VSB signal of a 10.76 MHz band. The matching filters 1315 and 1317 may generate a VSB signal by synthesizing the I signal and Q signal, and may perform filtering such that the signal to noise ratio (S/N) of the synthesized signal may be improved.

The poly-phase filter 1311, the down-conversion unit 1313, the matching filters 1315 and 1317, and the up-conversion unit 1319 may form the baseband demodulation unit 1310. A complex carrier wave signal corresponding to the carrier wave frequency offset and phase offset may be provided to the baseband demodulation unit, and the carrier wave frequency offset and phase offset may be reduced.

The DC remover (or pilot remover) 1320 may remove a pilot signal of the DC component. The down-sampler 1330 may down-sample (e.g., twice) the signal with, for example, a 21.52 MHz symbol rate such that, for example, 8-level symbols with a 10.76 kHz symbol rate may be restored.

The frequency tracking locking control unit 1340 may store a 1 field synchronization signal of the pilot-less VSB signal through 1 field buffer 1342. The stored 1 field synchronization signal may be provided to a carrier wave frequency compensation unit 1344 and the carrier wave may be compensated, for example, with respect to the carrier wave frequency offset estimated in the AFC 1350. The PN511 signal in the stored 1 field synchronization signal may be cross-correlated through a PN511 detection unit 1346 such that a frequency tracking locking signal (AFC_LOCK) may be generated.

The PN511 cross-correlation output may be affected by the carrier wave frequency offset and the carrier wave frequency offset value may be inversely proportional to a PN511 correlation detection value. The PN511 signal may not be detected, the estimation error of the carrier wave frequency offset may be larger, and a carrier wave frequency offset may be estimated in the next field synchronization signal interval. The PN511 correlation output may be detected, for example, if the remaining carrier wave frequency offset is within ±7~8 kHz.

As described above with reference to FIG. 9, the AFC 1350 self-correlates the PN63 signal in the VSB signal in which the pilot may be removed by the DC remover 1320, and may estimate the carrier wave frequency offset. The carrier wave frequency offset estimated by the AFC 1350 may be provided to the frequency tracking locking control unit 1340 and may generate the frequency tracking locking signal (AFC_LOCK), and to the mode selection unit 1380.

As described above, the pilot-less FPLL unit 1360 may estimate the carrier wave phase offset. The estimated carrier wave phase offset may be provided to the multi-loop filter 1370, which may be a LPF, and may be output as a phase error signal) in which the larger change of a momentary estimation value may be filtered. The multi-loop filter 1370 may have an internal integrator, which may integrate the carrier wave phase offset, may detect a lower frequency component, and may output the error signal.

In response to the frequency tracking locking signal (AFC_LOCK) the mode selection unit 1380 may transfer the carrier wave frequency offset estimated by the AFC 1350, and the phase error signal to the oscillator 1390.

The NCO 1390 may generate a complex carrier wave (e.g., cosine or sine) corresponding to the carrier wave frequency offset and the phase error signal, and may generate the complex carrier wave (e.g., cosine or sine) from a lookup table in which cosine values and sine values may be recorded. The complex carrier wave signal (e.g., cosine or sine) output from the NCO 1390, may be provided to the down-conversion unit 1313, and may be multiplied by an input VSB signal (IF signal) such that the carrier wave frequency offset and/or phase offset may be compensated for. The input signal from which the carrier wave frequency offset and/or phase offset may be removed may be provided to the matching filters 1315 and 1317.

The results of experiments to analyze the performance of a DTV receiver employing exemplary embodiments of the carrier wave frequency synchronization algorithm according to the present invention are shown in table 1. For example, a S/N ratio of 20 dB, a carrier wave frequency offset of ±70 kHz, a symbol timing frequency offset of 70 ppm were used as the simulation conditions, and a multi-loop filter having loop filter bandwidths of 3 kHz and 0.7 kHz were used.

TABLE 1

| | Mean values | | Variance | |
|---|---|---|---|---|
| | Offset 70 kHz | Offset −70 kHz | Offset 70 kHz | Offset −70 kHz |
| Brazil A channel | 69.9996 | −70.0005 | 0.0106 | 0.0106 |
| Brazil B channel | 70.0002 | −69.9993 | 0.0258 | 0.0254 |
| Brazil C channel | 70.0008 | −69.9995 | 0.0116 | 0.0116 |
| Brazil D channel | 70.0013 | −70.0007 | 0.0541 | 0.0544 |
| Brazil E channel | 70.0002 | −70 | 0.0478 | 0.0483 |
| Pilot distortion channel | 70.0002 | −70.0027 | 0.0046 | 0.0047 |

TABLE 2

| | Mean values | | Variance | |
|---|---|---|---|---|
| | Offset 70 kHz | Offset −70 kHz | Offset 70 kHz | Offset −70 kHz |
| Brazil A channel | 69.94 | −69.99 | $1.3 \times 10^{-6}$ | $1.31 \times 10^{-6}$ |
| Brazil B channel | 69.94 | −70.17 | $3.55 \times 10^{-6}$ | $4.10 \times 10^{-6}$ |

TABLE 2-continued

| | Mean values | | Variance | |
|---|---|---|---|---|
| | Offset 70 kHz | Offset −70 kHz | Offset 70 kHz | Offset −70 kHz |
| Brazil C channel | 69.94 | −70 | $5.31 \times 10^{-6}$ | $5.31 \times 10^{-6}$ |
| Brazil D channel | 69.94 | fail | $5.94 \times 10^{-6}$ | fail |
| Brazil E channel | 69.99 | fail | $5.95 \times 10^{-6}$ | fail |
| Pilot distortion channel | 70 | fail | $5.48 \times 10^{-6}$ | fail |

There may be a negative carrier wave frequency offset in an inferior channel environment, due to a low pass filter used to extract a pilot signal, and the power of the normal data signal may be greater than the power of the pilot signal such that the pilot signal may not be extracted. A pilot signal may be on the left hand edge of, for example, the 8-VSB frequency spectrum, there may be a negative frequency offset, the data component included in the low pass filter may have a larger power than, for example, when there may be a positive frequency offset, and the carrier wave offset may not be compensated for.

Accordingly, exemplary embodiments of the receiver according to the present invention may compensate for a carrier wave offset in a channel environment in which the pilot signal may be distorted, and may perform carrier wave synchronization.

Although exemplary embodiments of the present invention have been described in connection with an automatic frequency controller (AFC), it will be understood that any suitable frequency controller may be used.

Although exemplary embodiments of the present invention have been described in connection with pseudorandom number 63 (PN63) signals and/or pseudorandom number 511 (PN511) signals, it will be understood that any suitable signals may be used.

Although exemplary embodiments of the present invention have been described in connection with pilot-less frequency and phase locked loop (FPLL), it will be understood that any suitable frequency and phase locked loop may be used.

Although exemplary embodiments of the present invention have been described in connection with the estimation of a pilot-less carrier wave frequency offset, it will be understood that exemplary embodiments of the present invention may estimate a frequency offset of any suitable signal.

Although exemplary embodiments of the present invention have been described in connection with a delay-multiply method, it will be understood that any suitable method for estimating a frequency offset may be used.

Although exemplary embodiments of the present invention have been described in connection with a PN63 range, it will be understood that any suitable range may be utilized.

Although exemplary embodiments of the present invention have been described in connection with a numerically controlled oscillator (NCO), it will be understood that any suitable oscillator may be utilized, for example, a digitally controlled oscillator (DCO).

Although exemplary embodiments of the present invention have been described in connection with a CORDIC algorithm and a CORDIC operation unit, it will be understood that any suitable algorithm and/or operation unit (e.g., computer) for outputting a phase signal may be used.

Although exemplary embodiments of the present invention have been described in connection with a PN63 self-correlator, it will be understood that any suitable self-correlation device or component thereof may be used.

Although exemplary embodiments of the present invention have been described in connection with Brazil channel environments, it will be understood that exemplary embodiments of the present invention may be utilized in any suitable channel environment.

Although exemplary embodiments of the present invention have been described in connection with logic level '1' and '0', it will be understood that any suitable logic signal may be used.

Although exemplary embodiments of the present invention have been described in connection with a PN63 signal interval, it will be understood that any suitable signal interval may be utilized.

Although exemplary embodiments of the present invention have been described in connection with a Hilbert transform, it will be understood that any suitable transform may be utilized.

Although exemplary embodiments of the present invention have been described in connection with a vestigial sideband (VSB) signal and/or a pilot-less VSB signal, it will be understood that exemplary embodiments of the present invention may be utilized in connection with any suitable digital signal.

Although exemplary embodiments of the present invention have been described in connection with digital television, it will be understood that exemplary embodiments of the present invention may be utilized in connection with any suitable system, for example, audio, video, and/or communications system.

Although exemplary embodiments of the present invention have been described in connection with a two-fold symbol rate output from a pilot remover, it will be understood that any symbol rate may be used in connection with exemplary embodiments of the present invention.

Although exemplary embodiments of the present invention have been described in connection with a cosine or sine complex carrier wave, it will be understood that any suitable waveform may be utilized.

Although exemplary embodiments of the present invention have been described in connection with a low pass filter (LPF), it will be understood that any suitable filter may be used.

Although exemplary embodiments of the present invention have been described in connection with a '+−+' mode of, for example, a PN63 signal, it will be understood that any suitable mode may be utilized.

Although exemplary embodiments of the present invention have been described in connection with an offset estimation range of greater than or equal to 85 kHz, it will be understood that any suitable offset estimation range may be used.

Although exemplary embodiments of the present invention have been described in connection with a DTV receiver (e.g., an Advance Television Systems Committee DTV receiver), it will be understood that exemplary embodiments of the present invention may be implemented in or used in connection with any suitable receiver.

Although exemplary embodiments of the present invention have been described in connection with a poly-phase signal filter, it will be understood that any suitable signal filter may be used.

Although exemplary embodiments of the present invention have been described in connection with matching filters, it will be understood that any suitable filter may be used.

Although exemplary embodiments of the present invention have been described in connection with a VSB signal with a frequency of 5.38 MHz, 10.76 MHz or 24.69 MHz and a symbol rate of 21.52 MHz, it will be understood that any suitable frequency and symbol rate may be used.

Although exemplary embodiments of the present invention have been described in connection with an Intermediate Frequency (IF) signal, it will be understood that any suitable signal may be used.

Although exemplary embodiments of the present invention have been described in connection with improving a signal-to-noise (S/N) ratio of a synthesized signal, exemplary embodiments of the present invention may improve other characteristics of synthesized signals.

Although exemplary embodiments of the present invention have been described in connection with a multi-loop filter, it will be understood that any suitable filter may be used.

Although exemplary embodiments of the present invention have been described in connection with estimating a momentary estimation value, it will understood that exemplary embodiments of the present invention may estimate other values in connection with estimating a phase error signal.

Although exemplary embodiments of the present invention have been described in connection with an internal integrator, it will be understood that any suitable integrator, internal or external, may be used.

Although exemplary embodiments of the present invention have been described in connection with a S/N ratio of 20 dB, a carrier wave frequency offset of ±70 kHz, a symbol timing frequency offset of 70 ppm were used as the simulation conditions, and a multi-loop filter having loop filter bandwidths of 3 kHz and 0.7 kHz, it will be understood that any suitable S/N ratio, carrier wave frequency offset, symbol timing frequency offset of may be used as simulation conditions, and any suitable loop filter bandwidths may be used.

Although exemplary embodiments of the present invention have been described in connection with an 8-VSB signal, it will be understood that any suitable signal may be used.

While exemplary embodiments of the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of estimating a pilot-less carrier wave frequency offset comprising:
   receiving, by an automatic frequency controller, a vestigial sideband (VSB) signal for which a pilot has been removed, and
   performing, by the automatic frequency controller, self-correlation by correlating neighboring pseudorandom noise 63 (PN63) signals;
   estimating, by the automatic frequency controller, the frequency offset of the received VSB signal by sampling, delaying, and multiplying the self-correlated PN63 signal; and
   confirming, by an automatic frequency controller, whether or not the estimated frequency offset value is within a PN63 range.

2. The method of claim 1, further including,
   compensating for the frequency offset of the received VSB signal based on the estimated frequency offset.

3. The method of claim 1, wherein in estimating the frequency offset, the frequency offset is estimated based on the number of samples taken when sampling the PN63 self-correlated signal, the time interval of a signal a number of samples used to integrate a plurality of estimates of the frequency offsets.

4. The method of claim 1, wherein in estimating the frequency offset, the frequency offset is estimated by the equation $$\hat{f} = \frac{1}{2\pi D T_s} \sum_{k=1}^{M} \arg\left[\frac{\text{Im}[S_{PN63}(k) S^*_{PN63}(k-D)]}{\text{Re}[S_{PN63}(k) S^*_{PN63}(k-D)]}\right],$$

where D denotes the number of samples taken when sampling the PN63 self-correlated signal, $T_S$ denotes the time interval of a signal with sample rate of D number of times, $S_{PN63}$ denotes the PN63 self-correlated signal, $S^*_{PN63}$ denotes the complex conjugate of $S_{PN63}$, and M denotes the number of samples used to integrate a plurality of estimates of the frequency offsets.

5. The method of claim 1, wherein in estimating the frequency offset, when the self-correlated PN63 signal is sampled twice, a number of samples is 126 and the sampling time corresponds to 21.52 MHz.

6. The method of claim 3, wherein in estimating the frequency offset, a number of samples used to integrate a plurality of estimates is variably determined within a number of double oversampled samples of maximum two of the PN63 self-correlated signal intervals.

7. The method of claim 1, wherein confirming whether or not the estimated frequency offset value is within the range is based on a number of samples of the self-correlated signal, and a time interval of a signal with a sample rate corresponding to the number of samples.

8. The method of claim 1, wherein confirming whether or not the estimated frequency offset value is within the PN63 range is determined by the expression $$|\hat{f}| < \frac{1}{2DT_s},$$

where D denotes a number of samples of the PN63 elf-correlated signal, and $T_S$ denotes a time interval of a signal with a sample rate corresponding to the number of samples.

9. The method of claim 3, wherein in confirming whether or not the estimated frequency offset value is within the PN63 range, when the self-correlated PN63 signal is sampled twice, the number of samples is 126, the time interval corresponds to 21.52 MHz, and the PN63 range is ±85 kHz.

10. A pilot-less automatic frequency controller for estimating the frequency offset of a carrier wave, comprising:
a self-correlator, which receives an I signal and Q signal of a received VSB signal from which a pilot has been removed, and performs complex-multiplication of neighboring PN63 signals;
an operation unit, which receives a complex signal output from the self-correlator and outputs as a phase signal and an amplitude signal based on the complex signal;
a control unit, which receives the phase signal output from the operation unit and determines an interval of self-correlated PN63 signal based on the phase signal; and
a calculation unit, which obtains the mean value of the phase signal of the operation unit in response to the signal interval of the self-correlated on the interval of the PN63 signal.

11. The pilot-less automatic frequency controller of claim 10, wherein the self-correlator is a PN63 self correlator.

12. The pilot-less automatic frequency controller of claim 10, wherein the operation unit is a coordinate rotation digital computer (CORDIC) operation unit.

13. The pilot-less automatic frequency controller of claim 10, wherein the self-correlator has an input of the received pilot-less VSB signal with a symbol rate of an integer number of times.

14. The pilot-less automatic frequency controller of claim 10, wherein the control unit includes,
a first calculation unit, which receives the phase signal output from the operation unit and obtains the absolute value of the phase signal,
a delay unit, which delays the output of the first absolute value calculation unit, for a number of symbols,
an adder, which adds the output of the first calculation unit and the output of the delay unit and generates a signal corresponding to a difference between the outputs,
a second calculation unit, which receives the output of the adder and obtains an absolute value of the output of the adder,
a third calculation unit, which receives the output of the second calculation unit and obtains a mean value of the output of the second calculation unit; and
a comparator, which compares a reference signal with the mean value obtained by the third calculation unit, and outputs a signal indicating the interval of the PN63 signal.

15. A method for demodulating a carrier wave, comprising:
removing, by a DC remover, a pilot component from a received VSB signal;
estimating, by an automatic frequency controller, a carrier wave frequency offset from the pilot-less VSB signal by using a PN63 signal;
estimating, by the automatic frequency controller, a carrier wave phase offset from the pilot-less VSB signal; and
compensating, by an oscillator, for the carrier wave phase offset of the received VSB signal based on the estimated carrier wave frequency and phase offsets.

16. The method of claim 15, wherein estimating the carrier wave frequency offset includes,
receiving the VSB signal from which the pilot has been removed and performing self-correlation by correlating neighboring PN63 signals;
estimating the carrier wave frequency offset of the received VSB signal by sampling the self-correlated PN63 signal a number of times and performing delay-multiplication; and
confirming whether or not the estimated carrier wave frequency offset value is within a PN63 range.

17. The method of claim 15, wherein the carrier wave frequency offset is estimated by the equation $$\hat{f} = \frac{1}{2\pi D T_s} \sum_{k=1}^{M} \arg\left[\frac{\text{Im}[S_{PN63}(k) S^*_{PN63}(k-D)]}{\text{Re}[S_{PN63}(k) S^*_{PN63}(k-D)]}\right],$$

where D denotes the number of samples taken when sampling the self-correlated PN63 signal, $T_S$ denotes the time interval of the PN63 signal with sample rate of D number of times, $S_{PN63}$ denotes the PN63 self-correlated signal, $S^*_{PN63}$ denotes the complex conjugate of $S_{PN63}$, and M denotes the number of samples used to integrate a plurality of estimates of the carrier wave frequency offsets.

18. The method of claim 15, wherein in estimating the carrier wave frequency offset, when the self-correlated signal is sampled twice, a number of samples is 126 and the sampling time corresponds to 21.52 MHz.

19. The method of claim 15, wherein in estimating the carrier wave frequency offset, a number of samples used to integrate a plurality of estimates is variably determined within a number of double oversampled samples of maximum two of the self-correlated signal intervals.

20. The method of claim 15, wherein confirming whether or not the estimated carrier wave frequency offset value is within the PN63 range is determined by the expression $$|\hat{f}| < \frac{1}{2DT_s}.$$

where D denotes a number of samples of the self-correlated PN63 signal, and $T_S$ denotes a time interval of the self-correlated PN63 signal with a sample rate corresponding to the number of samples.

21. The method of claim 15, wherein in confirming whether or not the estimated carrier wave frequency offset value is within the PN63 range, when the self-correlated PN63 signal is sampled twice, the number of samples is 126, the time interval corresponds to 21.52 MHz, and the range is ±85 kHz.

22. The method of claim 15, further including, locking the estimated carrier wave frequency offset.

23. The method of claim 15, wherein estimating the carrier wave phase offset includes,
multiplying an I signal and a Q signal of the received pilot-less VSB signal, and
estimating the carrier wave phase offset by low-pass filtering the multiplication result.

24. The method of claim 15, wherein in compensating for the carrier wave phase and frequency offset of the received VSB signal, the output of a numerically controlled oscillator (NCO) is multiplied by the received VSB signal to compensate for the carrier wave frequency and phase offsets of the VSB signal.

25. An apparatus for demodulating a carrier wave comprising:
an analog-to-digital conversion unit, which converts a received VSB signal into a digital signal;
a baseband demodulation unit, which converts the digital signal of the analog digital conversion unit into I and Q baseband digital signals, and removes frequency and phase offsets of a carrier wave by multiplying a complex carrier wave signal provided by a numerically controlled oscillator (NCO);
a direct current (DC) remover, which removes a DC component of a pilot signal of a DC component in an output signal of the baseband demodulation unit;
an automatic frequency controller (AFC), which estimates the frequency offset of the carrier wave frequency from a frequency of the pilot-less VSB signal, by using a PN63 signal;
a frequency and phase locked loop (FPLL), which estimates the phase offset of the carrier wave phase from the phase of the pilot-less VSB signal;
a multi-loop filter, which integrates the carrier wave phase offset output of the FPLL, detects a low frequency component, and outputs a phase error signal; and
the numerically controlled oscillator (NCO), which in response to the estimated frequency offset and the phase error signal, generates a complex carrier wave signal.

26. The apparatus of claim 25, further including, a frequency tracking locking control unit, which locks the carrier wave frequency offset estimated by the AFC.

27. The apparatus of claim 26, wherein the frequency tracking locking control unit includes,
a field buffer unit, which stores one field synchronization signal of the pilot-less VSB signal,
a carrier wave frequency compensation unit, which compensates the carrier wave frequency of the stored one field synchronization signal according to the estimated carrier wave frequency offset, and
a detection unit, which cross-correlates PN511 signal in the stored one field synchronization signal and outputs a frequency tracking locking signal.

28. The apparatus of claim 25, further including,
a mode selection unit, which transfers the carrier wave frequency offset and the carrier wave phase offset to the NCO in response to the frequency tracking locking signal.

29. The apparatus of claim 25, wherein the AFC includes,
a self-correlator, which receives an I signal and Q signal of a received VSB signal from which a pilot has been removed, and performs complex-multiplication of neighboring signals;
an operation unit, which receives a complex signal output from the self-correlator and outputs as a phase signal and an amplitude signal based on the complex signal;
a control unit, which receives the phase signal output from the operation unit and determines an interval of a signal based on the phase signal; and
a calculation unit, which obtains the mean value of the phase signal of the operation unit in response to the signal interval of the signal.

30. The apparatus of claim 29, wherein the self-correlator is a PN63 self correlator.

31. The apparatus of claim 29, wherein the operation unit is a coordinate rotation digital computer (CORDIC) operation unit.

32. The apparatus of claim 29, wherein the calculation unit is a phase mean value calculation unit.

33. The apparatus of claim 29, wherein the self-correlator receives the received pilot-less VSB signal with the symbol rate of an integer number of times.

34. The apparatus of claim 29, wherein the control unit includes,
a first absolute value calculation unit, which receives the phase signal output from the operation unit and obtains the absolute value of the phase signal,
a delay unit, which delays the output of the first absolute value calculation unit, for a number of symbols,
an adder, which adds the output of the first absolute value calculation unit and the output of the delay unit and generates a signal corresponding to a difference between the outputs,
a second absolute value calculation unit, which receives the output of the adder and obtains an absolute value of the output of the adder,
a mean value calculation unit, which receives the output of the second absolute value calculation unit and obtains a mean value of the output of the second absolute value calculation unit; and a comparator, which compares a reference signal with the mean value obtained in the mean value calculation unit, and outputs a signal indicating the signal interval.

35. The apparatus of claim 25, wherein the baseband demodulation unit includes, a poly-phase filter, which compensates for the sampling timing offset of the VSB signal generated when the received VSB signal is converted into the digital signal in the analog-to-digital conversion unit, a down-conversion unit, which converts the received VSB signal into a baseband signal, matching filters, which generate a VSB signal by synthesizing an I signal and a Q signal of the baseband VSB signal, and filter the synthesized VSB signal to maximize the signal to noise ratio (S/N) of the signal, and an up-conversion unit, which receives the output of the matching filters, extracts real number signals, and recovers the received VSB signal.

* * * * *